US008922517B2

United States Patent
Shih et al.

(10) Patent No.: US 8,922,517 B2
(45) Date of Patent: Dec. 30, 2014

(54) METHOD FOR DETECTING TOUCH SPOT OF TOUCH PANEL

(71) Applicant: Tianjin Funayuanchuang Technology Co., Ltd., Tianjin (CN)

(72) Inventors: Po-Sheng Shih, Hsinchu (TW); Chien-Yung Cheng, Hsinchu (TW)

(73) Assignee: Tianjin Funayuanchuang Technology Co., Ltd., Tianjin (CN)

( * ) Notice: Subject to any disclaimer, the term of this patent is extended or adjusted under 35 U.S.C. 154(b) by 57 days.

(21) Appl. No.: 13/905,364

(22) Filed: May 30, 2013

(65) Prior Publication Data

US 2014/0354580 A1    Dec. 4, 2014

(51) Int. Cl.
*G06F 3/041*    (2006.01)
*G06F 3/044*    (2006.01)
(52) U.S. Cl.
CPC ..................... *G06F 3/044* (2013.01)
USPC .......................................... 345/173

(58) Field of Classification Search
None
See application file for complete search history.

(56) References Cited

U.S. PATENT DOCUMENTS

| 8,487,906 B2* | 7/2013 | Chen et al. ............ 345/174 |
| 8,624,873 B2* | 1/2014 | Huang et al. .......... 345/174 |
| 8,803,841 B2* | 8/2014 | Shih et al. ............ 345/174 |
| 2013/0057504 A1* | 3/2013 | Huang et al. .......... 345/174 |
| 2014/0022464 A1* | 1/2014 | Wu ..................... 349/12 |

* cited by examiner

*Primary Examiner* — Joseph Feild
*Assistant Examiner* — Parul Gupta
(74) *Attorney, Agent, or Firm* — Novak Druce Connolly Bove + Quigg LLP (57) ABSTRACT

A method for detecting touch spots of a touch panel. In the detecting process, a pulse signal is input into each of a plurality of first driving-sensing electrodes, thereby simulating an $R_{1n}C$ curve for computing a coordinate of the touch spots, at the high impedance direction. A pulse signal is input into each of a plurality of second driving-sensing electrodes, thereby simulating an $R_{2n}C$ curve. The coordinate of the touch spots, at a low impedance direction can be computed by the $R_{1n}C$ curve and the $R_{2n}C$ curve.

18 Claims, 8 Drawing Sheets

METHOD FOR DETECTING TOUCH SPOT OF TOUCH PANEL

BACKGROUND

1. Technical Field

The present disclosure relates to methods for detecting touch spots of touch panels, particularly to a method for detecting touch spots of surface capacitive touch panels.

2. Description of Related Art

Nowadays, capacitive touch panels having a high sensitivity are very popular. The capacitive touch panel commonly includes a transparent conductive layer and four electrodes respectively disposed on four corners of the transparent conductive layer. A voltage is applied on the transparent conductive layer by the four electrodes to form an equipotential plane. If a touch object (e.g. a bare finger or a conductive pen) touches the surface of the capacitive touch panel, a coupling capacity is formed between the touch object and the capacitive touch panel, and a current is generated between each of the electrodes and the touch spot. The current value is proportional to a distance between each of the electrodes and the touch spot. Thus, the location of the touch spot can be calculated according to a relation of the distance between each of the electrodes and the touch spot and the corresponding current value.

However, an accuracy of the above described detection method may be low.

What is needed, therefore, is to provide a method for accurately detecting the touch spot of the capacitive touch panel.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
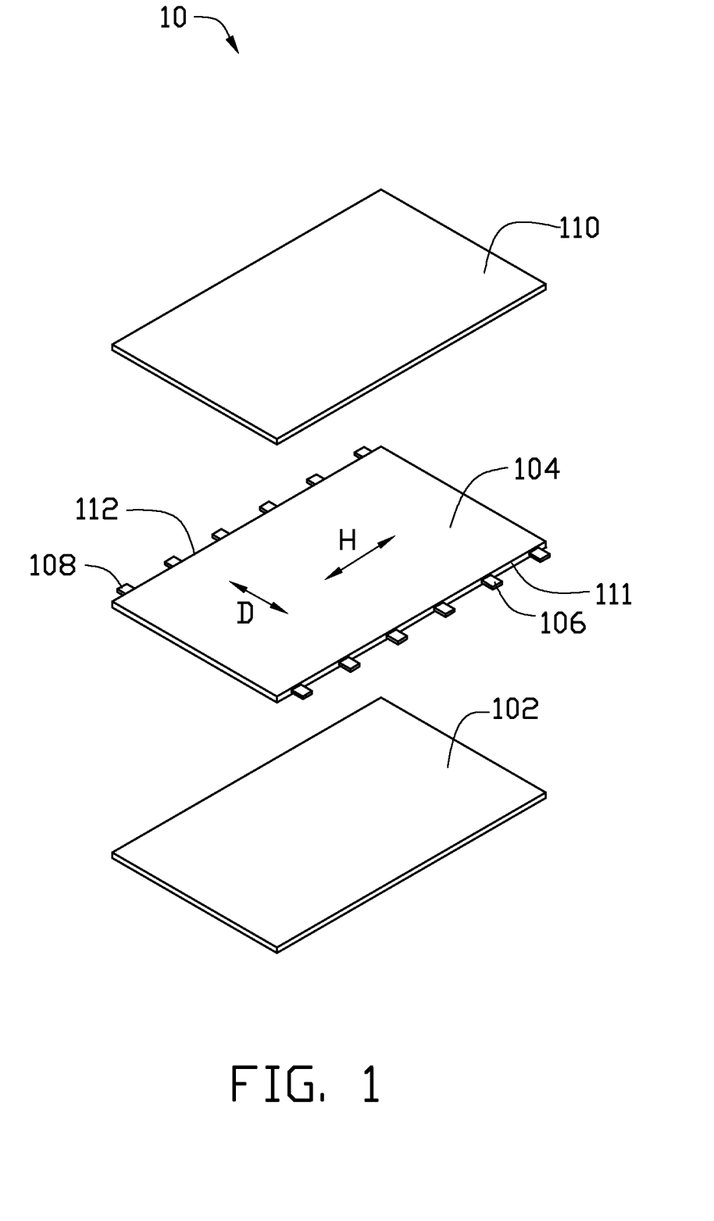
FIG. 1 shows a structural schematic view of one embodiment of the touch panel.
Figure 2:
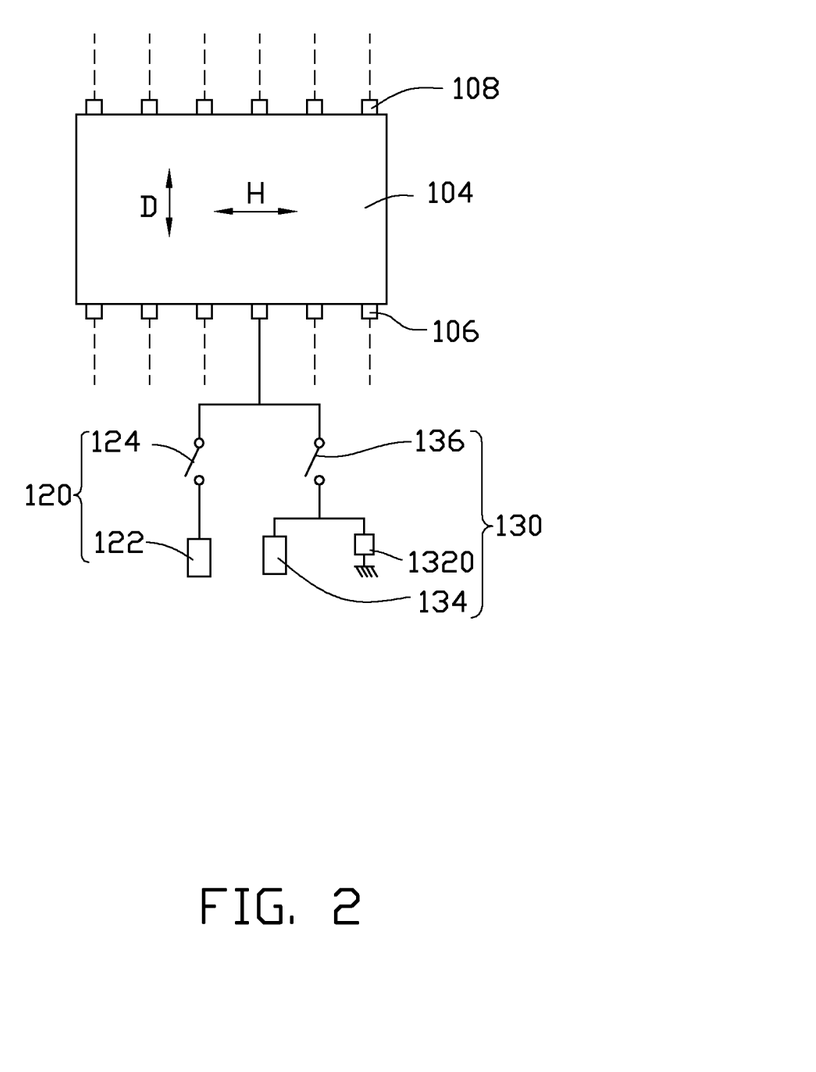
FIG. 2 shows a schematic view of one embodiment of a driving circuit and a sensing circuit electrically connected with each driving-sensing electrode of the touch panel.
Figure 3:
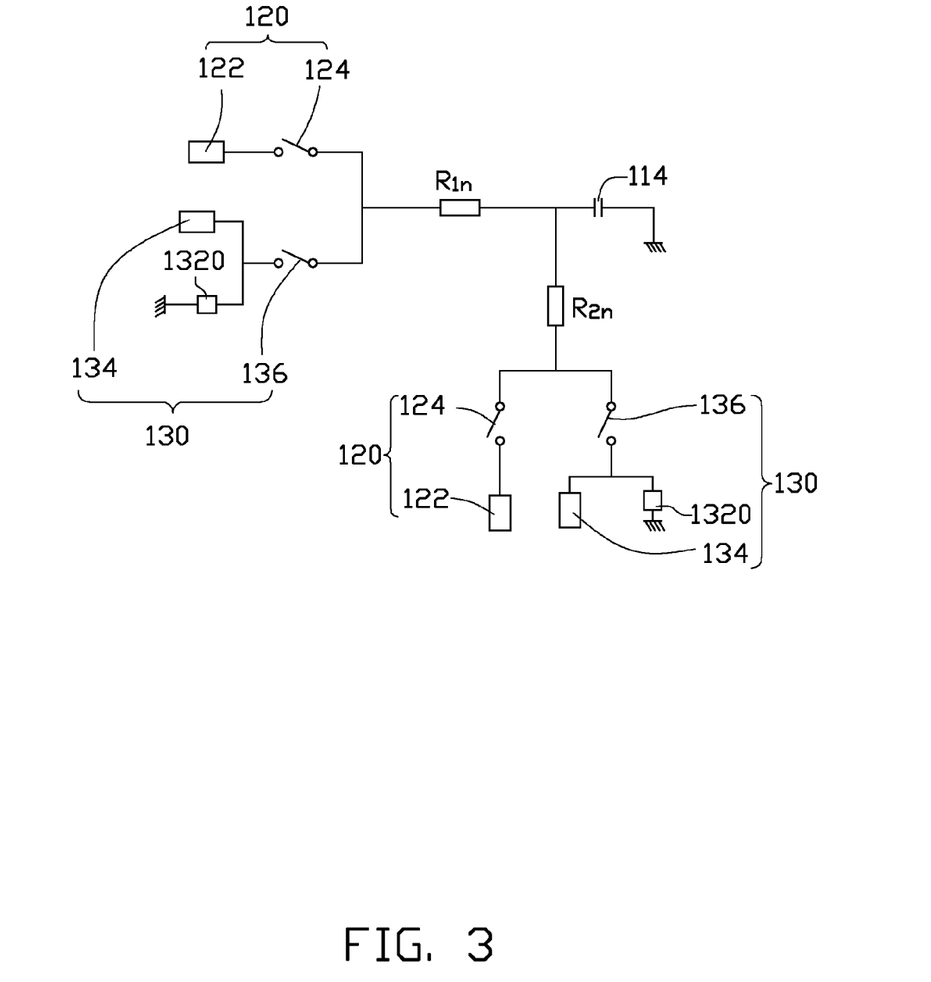
FIG. 3 shows a simplified circuit view when the touch panel is touched.

Referring to FIGS. 1 to 3, a touch panel 10 in one embodiment of a method for detecting touch spot includes: a substrate 102, a conductive film 104 disposed on the substrate 102, a plurality of first driving-sensing electrodes 106, and a plurality of second driving-sensing electrodes 108. The conductive film 104 has anisotropy of impedance and defines a low impedance direction D and a high impedance direction H therein. The low impedance direction D is substantially perpendicular to the high impedance direction H. The conductive film 104 has a first side 111 and a second side 112 opposite to the first side 111. The first side 111 and the second side 112 are arranged along the low impedance direction D. The plurality of first driving-sensing electrodes 106 are arranged along the first side 111 and spaced from each other. The plurality of second driving-sensing electrodes 108 are arranged along the second side 112 and spaced from each other. The plurality of first driving-sensing electrodes 106 and the plurality of second driving-sensing electrodes 108 are electrically connected with the conductive film 104. Further, each first driving-sensing electrode 106 is electrically connected with a driving circuit 120 and a sensing circuit 130, and each second driving-sensing electrode 108 is electrically connected with a driving circuit 120 and a sensing circuit 130. When the touch panel 10 is touched by a conductive object at a touch spot, a coupling capacitance 114 having a capacitance value C between the conductive film 104 and the conductive object is formed. A resistance of the conductive film 104 between the touch spot and the first driving-sensing electrodes 106 can be represented by $R_{11}, R_{12}, \ldots R_{1n}$ (n=1,2, 3 . . . ). A resistance of the conductive film 104 between the touch spot and the second driving-sensing electrodes 108 can be represented by $R_{21}, R_{22}, \ldots R_{2n}$ (n=1,2,3 . . . ).

The method for detecting the touch spot includes:

S1, inputting a pulse signal into each first driving-sensing electrode 106 by the driving circuit 120, and reading $R_{1n}C$ detected by each sensing circuit 130, thereby simulating a first curve of the $R_{1n}C$ along the high impedance direction H to compute coordinate of the touch spot at the high impedance direction H; and S2, inputting a pulse signal into each second driving-sensing electrode 108 by the driving circuit 120, and reading a $R_{2n}C$ detected by each sensing circuit 130, thereby simulating a second curve of the $R_{2n}C$ along the high impedance direction H;

S3, computing the coordinate of the touch spot at the low impedance direction D by the first curve and the second curve.

The structure of the touch panel 10 is specifically described as follows.

The substrate 102 can be made of a transparent material. The transparent material can be polythene, polycarbonate, polyethylene terephathalate, polymethyl Methacrylate, glass, quartz, or diamond.

The conductive film 104 is an anisotropic transparent conductive film. A conductivity of the conductive film 104 at the low impedance direction D is much larger than the conductivity of the conductive film 104 in other directions. A conductivity of the conductive film 104 in the high impedance direction H is smaller than the conductivity of the conductive film 104 in other directions. The low impedance direction D is substantially perpendicular to the high impedance direction H. In one embodiment, the conductive film 104 includes at least one carbon nanotube film drawn from a carbon nanotube array. A large number of the carbon nanotubes in the carbon nanotube film can be joined end by end along a preferred orientation. The carbon nanotube film can be a free-standing structure. The term "free-standing structure" can be defined as a structure that does not have to be supported by a substrate.

For example, a free-standing structure can sustain the weight of itself when it is hoisted by a portion thereof without any significant damage to its structural integrity. So, if the carbon nanotube film is placed between two separate supporters, a portion of the carbon nanotube drawn film, not in contact with the two supporters, would be suspended between the two supporters and yet maintain film structural integrity. The free-standing structure of the carbon nanotube film is realized by the successive carbon nanotubes joined end to end by van der Waals force. The carbon nanotubes have an excellent conductive along an axis of the carbon nanotubes. Thus, the carbon nanotube film has anisotropy of impedance. An extending direction of the carbon nanotubes is the low impedance direction D. A direction perpendicular to the extending direction of the carbon nanotubes is the high impedance direction H. In addition, a small number of the carbon nanotubes are randomly arranged in the carbon nanotube film. The randomly arranged carbon nanotubes are in contact with the adjacent carbon nanotubes, thus, the carbon nanotube film at the high impedance direction H has the conductivity lower than that of the carbon nanotube film at the other directions.

The first driving-sensing electrodes 106 are disposed on the first side 111, and the second driving-sensing electrodes 108 are disposed on the second side 112. In one embodiment, the first driving-sensing electrodes 106 and the second driving-sensing electrodes 108 are opposite one to one. A direction from one first driving-sensing electrode 106 to one second driving-sensing electrode 108 opposite to the first driving-sensing electrode 106 is substantially parallel to the low impedance direction D.

In another embodiment, the first driving-sensing electrodes 106 and the second driving-sensing electrodes 108 are alternately arranged. A direction from each of the first driving-sensing electrodes 106 to one of the second driving-sensing electrodes 108 is not parallel to the low impedance direction D.

A material of the first driving-sensing electrodes 106 and the second driving-sensing electrodes 108 can be conductive material. The conductive material can be metal, conductive polymer, conductive slurry, conductive gel, metallic carbon nanotubes, or indium tin oxide. A structure or a shape of the first driving-sensing electrodes 106 and the second driving-sensing electrodes 108 is not limited. The shape of the first driving-sensing electrodes 106 and the second driving-sensing electrodes 108 can be laminar shape, strip shape, blocky shape, rod shape, or other shape. In one embodiment, the first driving-sensing electrodes 106 and the second driving-sensing electrodes 108 are printed silver electrodes having a strip shape. In one embodiment, distances between the adjacent first driving-sensing electrodes 106 and the adjacent second driving-sensing electrodes 108 can be both in a range from about 3 millimeters (mm) to about 5 mm. A length direction of the first driving-sensing electrodes 106 and the second driving-sensing electrodes 108 can be substantially parallel to the high impedance direction H. The length of each of the first driving-sensing electrodes 106 and the second driving-sensing electrodes 108 can be in a range from about 1 mm to about 5 mm. Quantities of the first driving-sensing electrodes 106 and the second driving-sensing electrodes 108 are not limited and can be determined by a size of the conductive film 104. In one embodiment, the quantities of the first driving-sensing electrodes 106 and the second driving-sensing electrodes 108 are both six, the length of each of the first driving-sensing electrodes 106 and the second driving-sensing electrodes 108 is 1 mm, and the distances between the adjacent first driving-sensing electrodes 106 and the adjacent second driving-sensing electrodes 108 are both 3 mm.

The driving circuit 120 includes a charging circuit 122 and a first switch 124 for controlling the charging circuit 122. The charging circuit 122 is electrically connected with the first driving-sensing electrode 106 or the second driving-sensing electrode 108 in series by the first switch 124. The charging circuit 122 can be connected with a voltage source (not shown). The sensing circuit 130 includes a storage circuit 1320, a reading circuit 134, and a second switch 136 for controlling the storage circuit 1320 and the reading circuit 134. The storage circuit 1320 and the reading circuit 134 are electrically connected with each other in parallel, and are connected with the first driving-sensing electrode 106 or the second driving-sensing electrode 108 in series by the second switch 136. The driving circuit 120 and the sensing circuit 130 are connected with each other in parallel. The storage circuit 1320 can further be connected with a resistor (not shown) in series. The storage circuit 1320 is grounded by the resistor.

Furthermore, a transparent protective film 110 can be disposed on the conductive film 104 of the touch panel 10. A material of the transparent protective film 110 can be silicon nitride, silicon oxide, benzo cyclo butene (BCB), polyester or acrylic resin. The transparent protective film 110 can be a hardened plastic layer having a smooth scratch-resistant surface. In one embodiment, the material of the transparent protective film 110 is polyethylene terephthalate (PET). The transparent protective film 110 is used to protect the conductive film 104, thereby improving a durability of the touch panel 10. The transparent protective film 110 can be also used to decrease glare or reflection.

Furthermore, an adhesive layer (not shown) can be disposed between the conductive film 104 and the substrate 102 to firmly adhere the conductive film 104 and the substrate 102. The adhesive layer can also be disposed between the conductive film 104 and the transparent protective film 110 to firmly adhere the conductive film 104 and the transparent protective film 110. A material of the adhesive layer can be optical cement or UV adhesive.

Referring to FIG. 3, if a conductive object touches the touch panel 10, a circuit is composed of the resistance of the conductive film 104 between the touch spot and each first driving-sensing electrode 106 (or each second driving-sensing electrode 108) and the coupling capacitor 114. The $R_{1n}$ of the conductive film 104 between the touch spot and the different first driving-sensing electrodes 106 are different due to the position difference of the first driving-sensing electrodes 106. The $R_{2n}$ of the conductive film 104 between the touch spot and the different second driving-sensing electrodes 106 are also different due to the position difference of the second driving-sensing electrodes 108. The $R_{1n}$ of the conductive film 104 between the touch spot and the nearest first driving-sensing electrode 106 is less than the other $R_{1n}$ of the conductive film 104 between the touch spot and the other first driving-sensing electrodes 106 due to the anisotropy of impedance of the conductive film 104. The $R_{2n}$ of the conductive film 104 between the touch spot and the nearest second driving-sensing electrode 108 is less than the other $R_{2n}$ of the conductive film 104 between the touch spot and the other second driving-sensing electrodes 108. Each of the first driving-sensing electrodes 106 can detect one $R_{1n}C$ value, and each of the second driving-sensing electrodes 108 can detect one $R_{2n}C$ value. A coordinate of the touch spot at the high impedance direction H can be detected by the $R_{1n}C$ values or the $R_{2n}C$ values, and a coordinate of the touch spot at the low impedance direction D can be detected by comparing the $R_{1n}C$ values with the $R_{2n}C$ values.

A detecting process of the touch spot of the touch panel 10 is specifically described as follows.

Step S1

The $R_{1n}C$ is a product of the resistance $R_{1n}$ and the capacitance value C ($R_{1n}C$). The pulse signals can be input into the first driving-sensing electrodes 106 one by one or at the same time, and the $R_{1n}C$ values can be detected one by one or at the same time. The first curve composed by the $R_{1n}C$ values referring to the positions of the corresponded first driving-sensing electrodes 106 along the high impedance direction H can be then drawn. When the pulse signals are input into the first driving-sensing electrodes 106 one by one, the other first driving-sensing electrodes 106 without being input into the impulse signals are grounded. In addition, when the pulse signals are input into the first driving-sensing electrodes 106 one by one or at the same time, all the second driving-sensing electrodes 108 can be grounded, or input into the pulse signals one by one or at the same time.

Figure 4:
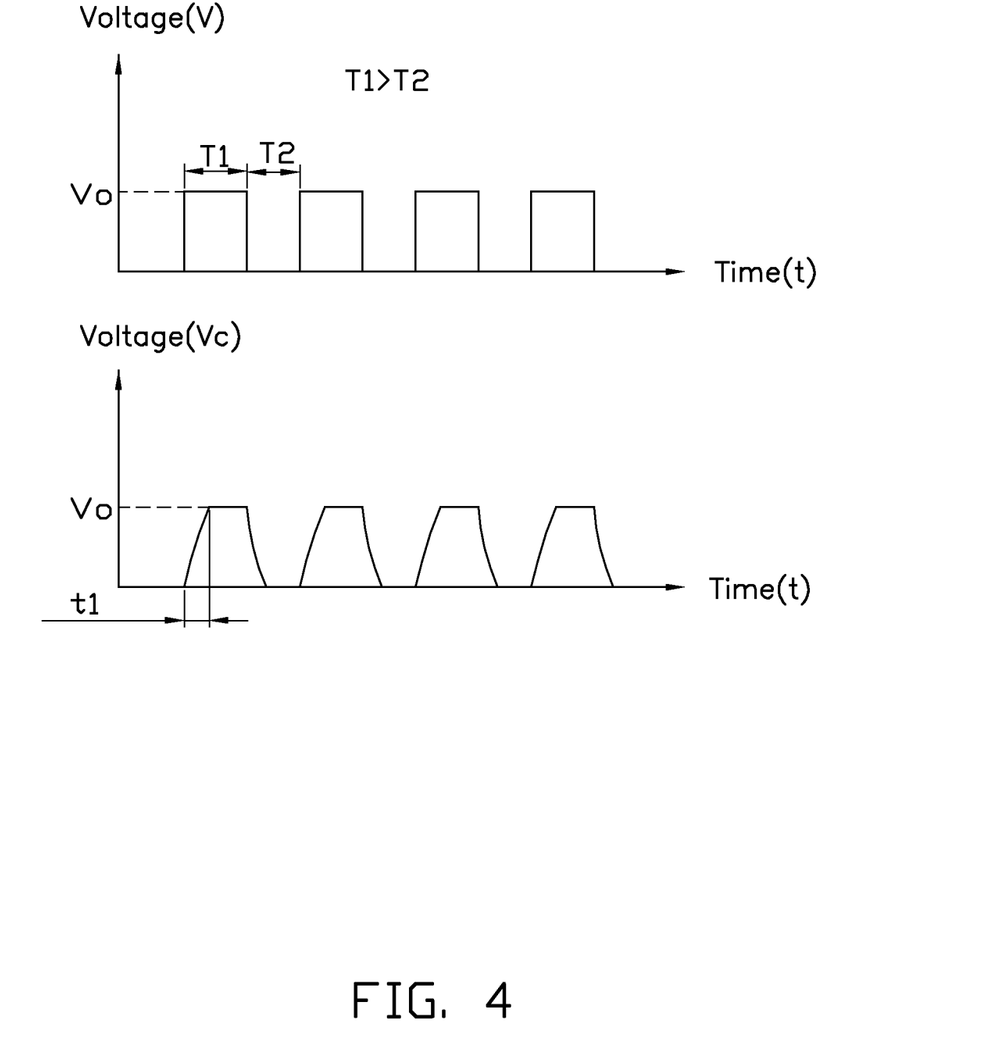
FIG. 4 shows voltage waveforms formed by a touch spot according to one embodiment.

The pulse signals can be input by controlling the first switch 124 and the second switch 136. Specifically, the first switch 124 and the second switch 136 can be alternately turned on to form the pulse signals. Referring to FIG. 4, VIII represents a voltage input into the conductive film 104 by the driving circuit 120, $V_C$ represents a voltage of the coupling capacitor 114. An opening period of the first switch 124 can be T1. An opening period of the second switch 136 can be T2. In the T1, the first switch 124 is turned on, and the second switch 136 is turned off. In the T2, the first switch 124 is turned off, and the second switch 136 is turned on. The T1 can be larger than or equal to the T2. In one embodiment, the T1 is larger than the T2.

When the first switch 124 and the second switch 136 are alternately turned on, the coupling capacitor 114 can be alternately charged and discharged by the charging circuit 122 and the storage circuit 1320. In the T1, the charging circuit 122 inputs a voltage $V_0$ ($V=V_0$) into the conductive film 104 by the first driving-sensing electrode 106 to charge the coupling capacitor 114. In the T2, the coupling capacitor 114 is discharged to the storage circuit 1320, and correspondingly, a voltage of the storage circuit 1320 changes.

In the T1, the coupling capacitor 114 is gradually charged to a steady state after a transient state of a period t1. In the t1, the voltage $V_C$ of the coupling capacitor 114 gradually increases to a constant voltage $V_0$ (at this time, $V_C=V_0$). In the T2, the coupling capacitor 114 is gradually discharged after a transient state of a period t1. During the transient state when the coupling capacitor 114 being charged or discharged, a voltage of the resistor in the storage circuit 1320 will correspondingly change. The reading circuit 134 can detect the voltage of the resistor in the storage circuit 1320 in the transient state of the coupling capacitor 114 and calculate the $R_{1n}C$ value at some time spot during t1. The calculating formula can be $$V_C = V_0 \times \left(1 - e^{\frac{t}{R_{1n}C}}\right),$$

wherein t represents a rise period of the voltage from 0 to $V_C$ of the coupling capacitor 114 in the transient state. When the pulse signals are input into each of the first driving-sensing electrodes 106, the reading circuit 134 connected with each of the first driving-sensing electrodes 106 can calculate one $R_{1n}C$ value during charging or discharging of the coupling capacitor 114 in the transient state. Thus, the first curve (an $R_{1n}C$ value changes curve) can be simulated. A coordinate of the touch spot at high impedance direction H can be detected by the first curve.

A detailed detecting process for detecting one signal touch spot or a plurality of touch spots is described as follows.

A Detecting Process of a Single Touch Spot

Figure 6:
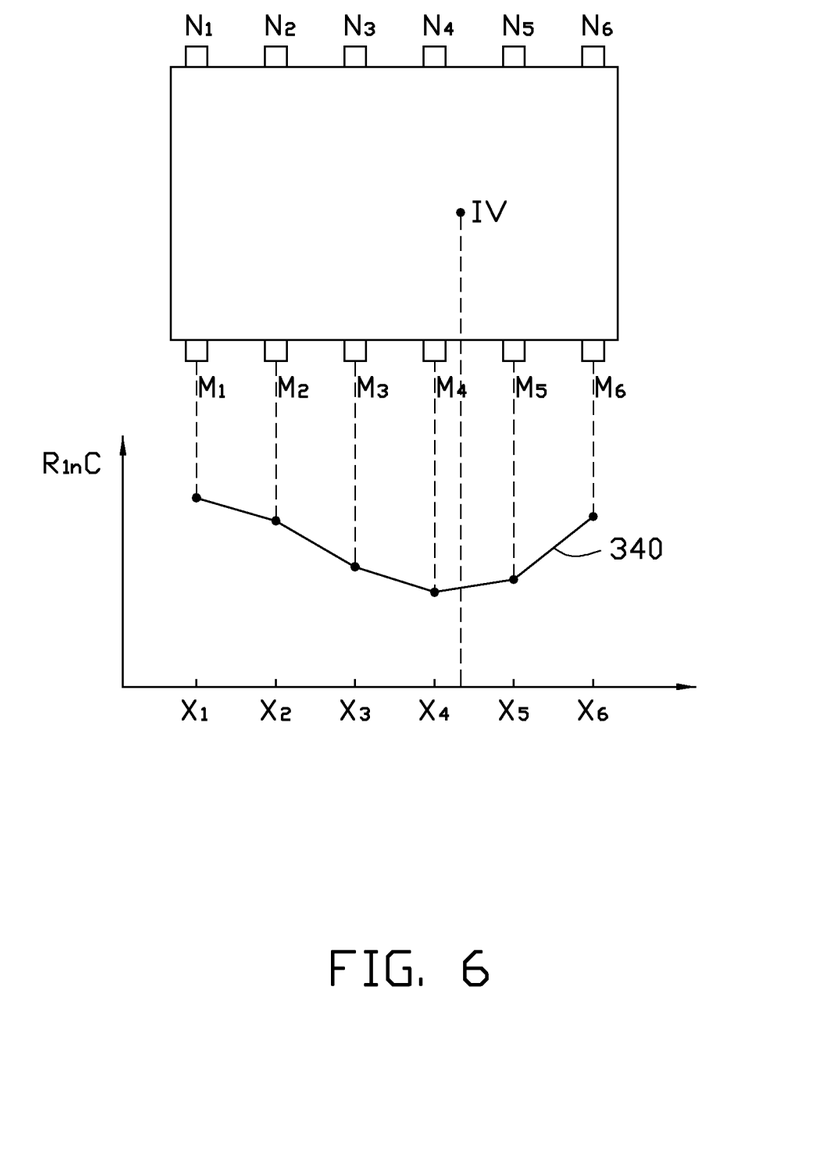
FIG. 6 shows one first curve in another simulation test for detecting touch spot IV on the touch panel.
Figure 7:
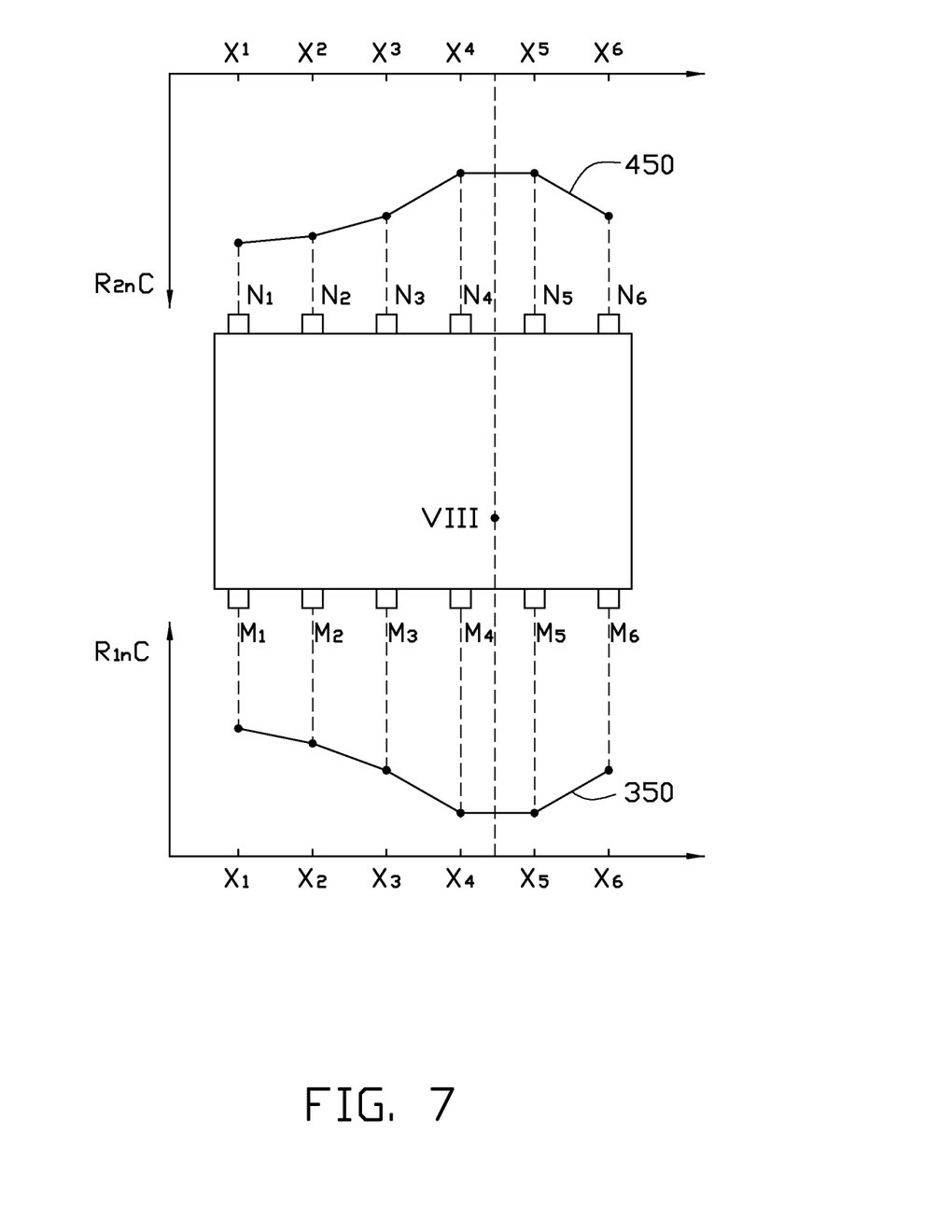
FIG. 7 shows one first curve and one second curve in another simulation test for detecting touch spot VIII on the touch panel.

Referring to FIGS. 6 to 7, five touch spots I~IV and VIII are detected. The five touch spots I~IV and VIII are formed at different time. Namely, a single touch spot is formed on the touch panel 10 at a certain time. The coordinates of the touch spots I~IV and VIII at the high impedance direction H can be detected by the first curves.

The first driving-sensing electrodes 106 are sequentially represented by M1, M2, M3, M4, M5, and M6, the second driving-sensing electrodes 108 are sequentially represented by N1, N2, N3, N4, N5, and N6. The first driving-sensing electrodes 106 are opposite to the second driving-sensing electrodes 108 one to one. The coordinates of the first driving-sensing electrode 106 and the second driving-sensing electrode 108 opposite to the first driving-sensing electrode at the high impedance direction H are the same. The coordinates of the first driving-sensing electrodes 106 and the second driving-sensing electrodes 108 at the high impedance direction H can be sequentially represented by X1, X2, X3, X4, X5, and X6. In the $R_{1n}C$ value, n is equal to 1, 2, . . . , or 6. The $R_{11}C$ value can be detected by M1. The $R_{12}C$ value can be detected by M2. The $R_{13}C$ value can be detected by M3. The $R_{14}C$ value can be detected by M4. The $R_{15}C$ value can be detected by M5. The $R_{16}C$ value can be detected by M6. In addition, in the $R_{2n}C$ value, n is equal to 1, 2, . . . , or 6. The $R_{21}C$ value can be detected by N1. The $R_{22}C$ value can be detected by N2. The $R_{23}C$ value can be detected by N3. The $R_{24}C$ value can be detected by N4. The $R_{25}C$ value can be detected by N5. The $R_{26}C$ value can be detected by N6.

The touch spots I~III sequentially occur along the low impedance direction D and on a straight line having the M4 and N4 thereon. The touch spot II is located in a middle position of the straight line between the M4 and N4. The touch spots I and III are symmetrical compared with the touch spot II.

The touch spot IV is located at a side of the straight line defined by the touch spots I~III and near the electrode M5. A perpendicular distance between the touch spot IV and the straight line having the M4 thereon along the low impedance direction D is less than a perpendicular distance between the touch spot IV and another straight line having the M5 thereon along the low impedance direction D.

The touch spot VIII is nearer to the M5 than the touch spot IV. A perpendicular distance between the touch spot VIII and the straight line having the M4 thereon along the low impedance direction D is equal to a perpendicular distance between the touch spot VIII and another straight line having the M5 thereon along the low impedance direction D. A distance between the touch spot VIII and the first side 111 is less than a distance between the touch spot V and the second side 112.

(1) A detecting process of the touch spots I~III

Figure 5:
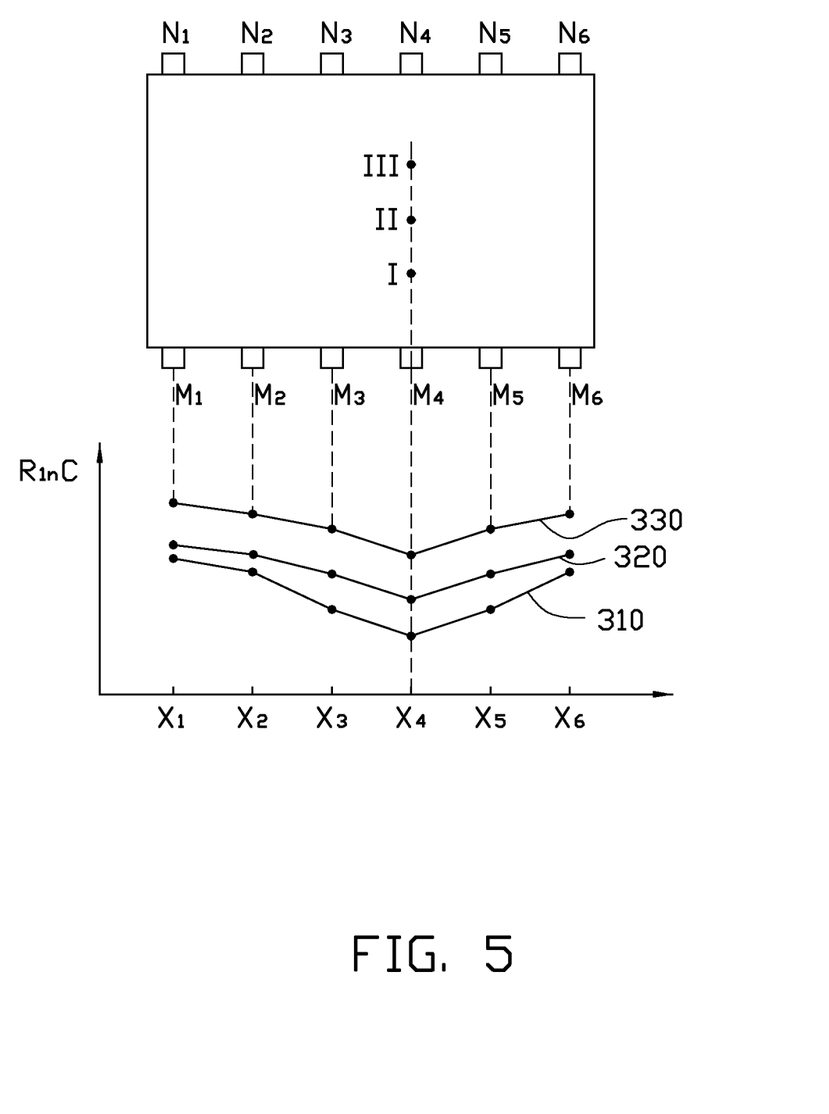
FIG. 5 shows three first curves in three simulation tests for detecting non-simultaneous touch spots I, II, and III on the touch panel.

Referring to FIG. 5, the first curve 310 shows the $R_{1n}C$ value change curve varied with the high impedance direction H when the touch spot I is touched. The touch spot I is opposite to the M4 and the $R_{14}$ is the smallest. Thus, the $R_{14}C$ value is the smallest in the first curve 310 and detected by the M4 opposite to the touch spot I and located at a valley of the first curve 310. The $R_{15}C$ value detected by the M5 and the $R_{13}C$ value detected by the M3 are equal and much large than the $R_{14}C$ value. The larger the distance between the first driving-sensing electrodes 106 and the touch spot I, the larger the $R_{1n}C$ values detected by the first driving-sensing electrodes 106, and the smaller a fluctuation amplitude of the first curve 310. A curve shape of the first curve 310 is symmetrical compared with the straight line having the valley thereon along the low impedance direction D. The coordinate of the touch spot I at the high impedance direction H is X4 which can be determined by the curve shape of the first curve 310. In addition, the coordinate of the touch spot I at the high impedance direction H can also be calculated by an interpolation method. The formula of the interpolation method is as follows:

$$X_I = \frac{X_3 \Delta R_{13}C + X_5 \Delta R_{15}C}{\Delta R_{13}C + \Delta R_{15}C},$$

$$X_I = \frac{X_3 \Delta R_{13}C + X_4 \Delta R_{14}C + X_5 \Delta R_{15}C}{\Delta R_{13}C + \Delta R_{14}C + \Delta R_{15}C}, \text{ or } X_I = \frac{\sum_{n=1}^{E} X_{In} \Delta R_{In}C}{\sum_{n=1}^{E} \Delta R_{In}C}.$$

In one embodiment, the coordinate of the touch spot I at the high impedance direction H is calculated by the formula:

$$X_I = \frac{X_3 \Delta R_{13}C + X_5 \Delta R_{15}C}{\Delta R_{13}C + \Delta R_{15}C}.$$

In the above formula, E is the total number of the first driving-sensing electrodes 106, $\Delta R_{1n}C = R_{1k}C - R_{1n}C$, $R_{1k}C$ represents the largest $R_{1n}C$ value. In one embodiment, E is equal to 6. It can be shown that $R_{1k}C$ value is $R_{11}C$ from the FIG. 6 when the touch spot I is detected.

The first curve 320 is the $R_{1n}C$ value change curve when the touch spot II is detected. The first curve 330 is the $R_{1n}C$ value change curve when the touch spot III is detected. The curve shapes of the first curve 320 and the first curve 330 are similar with that of the first curve 310. The resistance $R_{1n}$ between the touch spot II or III and the first driving-sensing electrodes 106 is larger than the resistance $R_{1n}$ between the touch spot I and the first driving-sensing electrodes 106. Thus, the $R_{1n}C$ value detected by the first driving-sensing electrode 106 when the touch spot II or III is detected is larger than the $R_{1n}C$ value detected by the same first driving-sensing electrode 106 when the touch spot I is detected. The coordinates of the touch spot II and III at the high impedance direction H can be calculated by the above formula.

Thus, three $R_{1n}C$ values in the first curve can be selected and compared. The selected three $R_{1n}C$ values are less than the other $R_{1n}C$ values in the first curve. If two $R_{1n}C$ values are equal in the three $R_{1n}C$ values, and the two first driving-sensing electrodes 106 for detecting the two same $R_{1n}C$ values are symmetrical compared with the another first driving-sensing electrode 106, the coordinate of the touch spot at the high impedance direction H is equal to the coordinate of the another first driving-sensing electrode 106 at the high impedance direction H. The coordinate of the touch spot can be directly read or calculated by the interpolation method.

(2) A detecting process of the touch spot IV

Referring to FIG. 6, the first curve 340 is the $R_{1n}C$ value change curve when the touch spot IV is detected. The touch spot IV is located on a side of the straight line defined by the touch spots I~III and near M5. A perpendicular distance between the touch spot IV and the straight line having the M4 thereon along the low impedance direction D is less than the perpendicular distance between the touch spot IV and the straight line having the M5 thereon along the low impedance direction D. Thus, the $R_{14}C$ value detected by the M4 is less than the $R_{15}C$ value detected by the M5. The $R_{13}C$ value detected by the M3 is larger than the $R_{15}C$ value detected by the M5. The $R_{1n}C$ values detected by the other first driving-sensing electrodes 106 are much larger than the $R_{1n}C$ values (n=3, 4, or 5) detected by the M3, M4, or M5, and the change amplitude decreases. Thus, it can be concluded by the first curve that the touch spot IV is located between the straight line having the M4 thereon and the straight line having the M5 thereon and near M4. Furthermore, the coordinate of the touch spot IV at the high impedance direction H can be accurately calculated by the interpolation method. The specific formula can be $$X_{IV} = \frac{\sum_{n=1}^{E} X_{In} \Delta R_{In}C}{\sum_{n=1}^{E} \Delta R_{In}C},$$

wherein $\Delta R_{1n}C = R_{1k}C - R_{1n}C$, $R_{1k}C$ is the largest $R_{1n}C$ value detected by the first driving-sensing electrodes 106. In one embodiment, E is equal to 6. Referring to FIG. 6, the $R_{1k}C$ is $R_{11}C$ when the touch spot I is detected.

In addition, the $R_{11}C$ value detected by the M1, the $R_{12}C$ value detected by the M2, and the $R_{16}C$ value detected by the M6 are larger than the $R_{1n}C$ values detected by the other first driving-sensing electrodes 106, and the change amplitude is much smaller. Thus, the coordinate of the touch spot IV at the high impedance direction H can be accurately calculated by the follow formula:

$$X_{IV} = \frac{X_3 \Delta R_{13}C + X_4 \Delta R_{14}C + X_5 \Delta R_{15}C}{\Delta R_{13}C + \Delta R_{14}C + \Delta R_{15}C}, \text{ or } X_{IV} = \frac{X_4 \Delta R_{14}C + X_5 \Delta R_{15}C}{\Delta R_{14}C + \Delta R_{15}C}.$$

In one embodiment, the coordinate of the touch spot IV at the high impedance direction H is calculated by the formula $$X_{IV} = \frac{X_3 \Delta R_{13}C + X_4 \Delta R_{14}C + X_5 \Delta R_{15}C}{\Delta R_{13}C + \Delta R_{14}C + \Delta R_{15}C}.$$

(3) A detecting process for detecting the touch spot VIII

Referring to FIG. 7, the first curve 350 is the $R_{1n}C$ value change curve when the touch spot VIII is detected. The perpendicular distance between the touch spot VIII and the straight line having the M5 thereon along the low impedance direction D is equal to the perpendicular distance between the touch spot VIII and the straight line having the M5 thereon along the low impedance direction D. Thus, the $R_{14}C$ value detected by the M4 is equal to the $R_{15}C$ value detected by the M5, and the $R_{13}C$ value detected by the M3 is equal to the $R_{16}C$ value detected by the M6. The $R_{13}C$ value and the $R_{16}C$ value are larger than the $R_{14}C$ value and the $R_{15}C$ value. Thus, it can be concluded that the touch spot VIII is located on a central axis of a straight line defined by the M4 and the M5, and the coordinate of the touch spot VIII at the high impedance direction H can be determined. In addition, the coordinate of the touch spot VIII can be calculated by the follow formula:

$$X_{VIII} = \frac{X_4 \Delta R_{14} C + X_5 \Delta R_{15} C}{\Delta R_{14} C + \Delta R_{15} C}, X_{VIII} = \frac{X_4 \Delta R_{14} C + X_5 \Delta R_{15} C + X_6 \Delta R_{16} C}{\Delta R_{14} C + \Delta R_{15} C + \Delta R_{16} C},$$

$$X_{VIII} = \frac{X_4 \Delta R_{14} C + X_5 \Delta R_{15} C + X_3 \Delta R_{13} C}{\Delta R_{14} C + \Delta R_{15} C + \Delta R_{13} C}, \text{ or } X_{VIII} = \frac{\sum_{n=1}^{E} X_{1n} \Delta R_{1n} C}{\sum_{n=1}^{E} \Delta R_{1n} C},$$

wherein $\Delta R_{1n} C = R_{1k} C - R_{1n} C$, $R_{1k} C$ is the largest $R_{1n} C$ value detected by the first driving-sensing electrodes 106. In one embodiment, E is equal to 6. Referring to FIG. 7, the $R_{1k}C$ is $R_{11}C$ when the touch spot I is touched.

Thus, if the coordinate of the single touch spot at the high impedance direction H cannot be determined only by the first curve, the coordinate can be detected by the following steps:

S31, at least selecting the largest $R_{1k}C$ value, the smallest $R_{1x}C$ value in the valley of the first curve, a second small $R_{1y}C$ value;

S32, calculating the coordinate of the touch spot at the high impedance direction H by using the smallest $R_{1x}C$ value, the second small $R_{1y}C$ value, the coordinate of the first driving-sensing electrode 106 for detecting the smallest $R_{1x}C$ value at the high impedance direction H, the coordinate of the first driving-sensing electrode 106 for detecting the second small $R_{1y}C$ value at the high impedance direction H in the interpolation method.

In the step S31, the second small $R_{1y}C$ value is only larger than or equal to the smallest $R_{1x}C$ value and less than the other $R_{1n}C$ values in all the $R_{1n}C$ values detected by the first driving-sensing electrodes 106. If the coordinate of the single touch spot at the high impedance direction H cannot be determined only by the first curve, the second small $R_{1y}C$ value is larger than the smallest $R_{1x}C$ value. In the step S32, the formula of the interpolation method is $$\frac{X_x \Delta R_{1x} C + X_y \Delta R_{1y} C}{\Delta R_{1x} C + \Delta R_{1y} C},$$

wherein $\Delta R_{1x}C = R_{1k}C - R_{1x}C$, $\Delta R_{1y}C = R_{1k}C - R_{1y}C$, $X_x$ represents the coordinate of the first driving-sensing electrode 106 for detecting the smallest $R_{1x}C$ value, $X_y$ represents the coordinate of the first driving-sensing electrode 106 for detecting the second small $R_{1y}C$ value.

In addition, the coordinate of the touch spot at the high impedance direction H can be directly detected by the first curve or the interpolation method. Specifically, if the $R_{1x}C$ value and the second small $R_{1y}C$ value are equal in the first curve, the coordinate of the touch spot can be calculated by the formula $$\frac{X_x \Delta R_{1x} C + X_y \Delta R_{1y} C}{\Delta R_{1x} C + \Delta R_{1y} C}.$$

If the $R_{1x}C$ value and the second small $R_{1y}C$ value are not equal, a third small $R_{1z}C$ value can be selected. The third small $R_{1z}C$ value and the second small $R_{1y}C$ value are equal, the coordinate of the touch spot can be calculated by using the $R_{1z}C$ value, the $R_{1y}C$ value, the coordinate $X_z$ of the first driving-sensing electrode 106 for detecting the $R_{1z}C$ value, and the coordinate of the first driving-sensing electrode 106 for detecting the $R_{1y}C$ value in the interpolation method. The formula is $$\frac{X_z \Delta R_{1z} C + X_y \Delta R_{1y} C}{\Delta R_{1z} C + \Delta R_{1y} C},$$

wherein the $R_{1y}C$ value is equal to the $R_{1z}C$ value, and $\Delta R_{1z}C = R_{1k}C - R_{1z}C$.

In addition, the coordinates of the above touch spots can be detected by only selecting three $R_{1n}C$ values in the first curve, and using the three $R_{1n}C$ values and the coordinates of the three corresponding first driving-sensing electrodes 106 at the high impedance direction H in the interpolation method. The formula for calculating the coordinate can be $$\frac{X_x \Delta R_{1x} C + X_y \Delta R_{1y} C + X_Z \Delta R_{1Z} C}{\Delta R_{1x} C + \Delta R_{1y} C + \Delta R_{1Z} C}.$$

The smallest $R_{1x}C$ value and the second small $R_{1y}C$ value can be the same or different, and the second small $R_{1y}C$ value and the third small $R_{1z}C$ value can be the same or different. In addition, the coordinate of the touch spot can be calculated by using all the $R_{1n}C$ values in the first curve and the coordinates of all the first driving-sensing electrodes 106 at the high impedance direction H in the interpolation method. Wherein the formula of the interpolation method can be $$\frac{\sum_{n=1}^{E} X_{1n} \Delta R_{1n} C}{\sum_{n=1}^{E} \Delta R_{1n} C},$$

wherein E is the total number of the first driving-sensing electrodes 106.

A Detecting Process for Detecting the Plurality of Touch Spot

Figure 8:
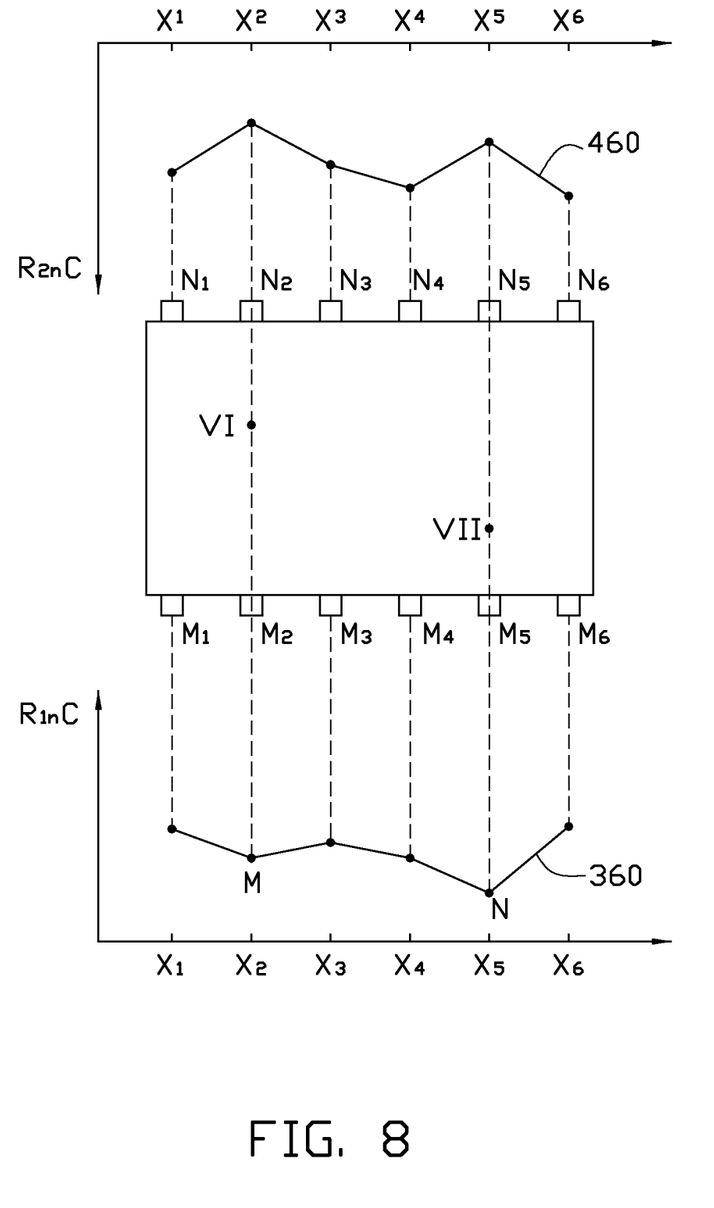
FIG. 8 shows one first curve and one second curve in another simulation test for detecting simultaneous touch spots VI and VII.

Referring to FIG. 8, if the touch spots VI and VII are simultaneously formed on the touch panel. The pulse signals can be input sequentially or simultaneously into the first driving-sensing electrodes 106 by the driving circuits 120. The sensing circuits 130 can read the $R_{1n}C$ values. The first curve 360 can be composed of the $R_{1n}C$ values varied along the high impedance direction H. It is clearly shown that the first curve 360 is different from the simulated first curves when detecting a single touch (e.g., in FIGS. 5 to 7). Two valleys M and N appear on the first curve 360. The $R_{1M}C$ value is corresponding to the valley M, and the $R_{1N}C$ value is corresponding to the valley N. The other $R_{1n}C$ values detected by the other first driving-sensing electrodes 106 are larger than the $R_{1M}C$ value and the $R_{1N}C$ value. Then, the $R_{1(M+1)}C$ value and the $R_{1(M-1)}C$ value detected by the first driving-sensing electrodes 106 adjacent to the first driving-sensing electrode 106 for detecting the $R_{1M}C$ value are selected. The $R_{1(N+1)}C$ value and the $R_{1(N-1)}C$ value detected by the first driving-sensing electrodes 106 adjacent to the first driving-sensing electrode 106 detecting the $R_{1N}C$ value are selected. Referring to FIG. 8, the $R_{11}C$ value, the $R_{12}C$ value, and the $R_{13}C$ value are respectively detected by the first driving-sensing electrodes M1, M2, and M3 corresponding to the valley M. The $R_{14}C$ value, the $R_{15}C$ value, and the $R_{16}C$ value are respectively detected by the first driving-sensing electrodes M4, M5, and M6 corresponding to the valley N. The coordinate of each of the touch spots can be calculated by using the three $R_{1n}C$ values corresponding to the valley in the first curve, and the coordinates of the three first driving-sensing electrodes corresponding to the three $R_{1n}C$ values in the interpolation method. The formula of the interpolation method for calculating the touch spots VI and VII at the high impedance direction H is the same as the formula of the interpolation method for calculating the coordinate of the single touch spot.

Thus, if the coordinates of the plurality of touch spots at the high impedance direction H cannot be directly read by the first curve, the coordinates of the plurality of touch spots can be detected by the following steps: S31, simulating the first curve composed of the $R_{1n}C$ values detected by the first driving-sensing electrodes 106; S32, selecting a plurality of smallest $R_{1n}C$ value ($R_{1x1}C$, $R_{1x2}C$, ... $R_{1xm}C$) corresponding to a plurality of valleys from the first curve, and a plurality of adjacent $R_{1y1}C$, $R_{1y2}$, ... $R_{1ym}$ values adjacent to the $R_{1x1}C$, $R_{1x2}C$, ... $R_{1xm}C$; S33, calculating the coordinates of the plurality of touch spots by using the $R_{1xm}C$ value, the $R_{1ym}C$ value, the coordinates of the first driving-sensing electrodes 106 detecting the $R_{1xm}C$ value and the $R_{1ym}$ value at the high impedance direction H in the interpolation method.

The conductive film 104 has anisotropy of impedance. The plurality of first driving-sensing electrodes 106 are disposed on a side of the conductive film 104 and arranged along the high impedance direction H. The resistance value $R_{1n}$ between the touch spot and the nearest first driving-sensing electrode 106 is less than the resistance values $R_{1n}$ between the touch spot and the other first driving-sensing electrodes 106 due to the anisotropy of impedance. Thus, there is a larger difference between the $R_{1n}C$ values detected by the adjacent first driving-sensing electrodes, which will improve an accuracy of the method for detecting the coordinate of the touch spot. If a plurality of touch spots is detected, a detecting interference between the plurality of touch spots is small. Thus, the touch spot is easy to be located.

Step S2

If the coordinate of the touch spot at the high impedance direction H cannot be directly read by the first curve in the step S1, the coordinate of the touch spot at the low impedance direction D can be detected by the following steps:

S41, simulating the second curve composed of the plurality of $R_{2n}C$ values detected by the second driving-sensing electrodes 108;

S42, selecting the smallest $R_{2x}C$ value at valley of the second curve, and the second small $R_{2y}C$ value;

S43, calculating the ratio of the total of the smallest $R_{1x}C$ value and the second small $R_{1y}C$ value, and the total of the smallest $R_{2x}C$ value and the second small $R_{2y}C$ value by the formula $$\frac{R_{1x}C + R_{1y}C}{R_{2x}C + R_{2y}C},$$

and concluding the distance between the touch spot and the first side 111 and between the touch spot and the second side 112 to obtain the coordinate of the touch spot at the low impedance direction D.

In the step S41, the pulse signals can be input into the second driving-sensing electrodes 108 one by one or at the same time.

In the step S42, the second small $R_{2y}C$ value is only larger than or equal to the smallest small $R_{2x}C$ value and less than the other $R_{2n}C$ values in all the $R_{2n}C$ values of the second curve. If the coordinate of the touch spot at the high impedance direction H cannot be directly read by the first curve in the step S1, the second small $R_{2y}C$ value is only larger than the smallest small $R_{2x}C$.

In the step S43, the resistance $R_{1n}$ between the touch spot and the first side 111 is proportional to the distance between the touch spot and the first side 111, and the resistance $R_{2n}$ between the touch spot and the second side 112 is proportional to the distance between the touch spot and the second side 112. Thus, the distance between the touch spot and the first side 111 and between the touch spot and the second side 112 can be calculated by the above ratio. Thus, the coordinate of the touch spot at the low impedance direction D can be located.

Referring to FIG. 7, if the touch spot VIII is touched, the simulated second curve 450 is similar to the first curve 350 detected by the first driving-sensing electrodes 106. The $R_{23}C$ value detected by N3 is equal to the $R_{24}C$ value detected by the N4, and the $R_{22}C$ value detected by the N2 adjacent to the N3 is equal to the $R_{25}C$ value detected by the N5 adjacent to the N4. The $R_{22}C$ value is larger than the $R_{24}C$ value and the $R_{23}C$ value. The $R_{23}C$ value and the $R_{24}C$ value are larger than $R_{13}C$ value and $R_{14}C$ value because the distance between the touch spot and the first side 111 is smaller than the distance between the touch spot and the second side 112.

In addition, if the coordinate of the touch spot at the high impedance direction H can be directly read in the step S1, the coordinate of the touch spot at the low impedance direction D can be detected by the following step: selecting the smallest $R_{2n}C$ value and second small $R_{2n}C$ value in the second curve; comparing the sum of two equal $R_{2n}C$ values in the selected $R_{2n}C$ values and the sum of two equal $R_{1n}C$ values in the selected $R_{1n}C$ values in the first curve, thereby calculating the coordinate of the touch spot at the low impedance direction D.

Referring to FIG. 7, if the touch spot VIII is touched, the simulated second curve 450 is similar to the first curve 350. The $R_{23}C$ value detected by the N3 is equal to the $R_{24}C$ value detected by the N4. The $R_{22}C$ value detected by the N2 adjacent to N3 is equal to the $R_{25}C$ value detected by the N5 adjacent to N4. The $R_{23}C$ value detected by the N3 and the $R_{24}C$ value detected by the N4 are larger than the $R_{13}C$ value detected by the M3 and the $R_{14}C$ value detected by the M4. The distance between the touch spot VIII and the first side 111 is less than the distance between the touch spot VIII and the second side 112. Thus, the resistance $R_{23}$ between the N3 and the touch spot VIII and the resistance $R_{24}$ between the N4 and the touch spot VIII are larger than the resistance $R_{13}$ between the M3 and the touch spot VIII and the resistance $R_{14}$ between the M4 and the touch spot VIII. In the process of simulating the first curve and the second curve, the pulse signals can be input into the first driving-sensing electrodes 106 and the second driving-sensing electrodes 108 at the same time or one by one.

Thus, the coordinate of the touch spot VIII at the low impedance direction D can be calculated by the formula of $$\frac{R_{23}C + R_{24}C}{R_{13}C + R_{14}C}, \frac{R_{22}C + R_{23}C + R_{24}C}{R_{12}C + R_{13}C + R_{14}C},$$

$$\text{or } \frac{R_{21}C + R_{22}C + R_{23}C + \ldots + R_{26}C}{R_{11}C + R_{12}C + R_{13}C + \ldots + R_{16}C}.$$

The coordinates of the touch spots I~IV at the low impedance direction D can also be calculated by the above method.

Referring to FIG. 8, the coordinates of the two touch spots VI and VII at the low impedance direction D can be detected by the same method for detecting the single touch spot at the low impedance direction D.

The step S1 and the step S2 can be simultaneously or respectively executed. The coordinates of the single touch spot or the plurality of touch spots at the high impedance direction H and the low impedance direction D can be detected by the above method, thereby obtained the location of the touch spots.

The coordinate of the touch spot at the high impedance direction H can be detected by the $R_{1n}C$ values read by the plurality of first driving-sensing electrodes 106, or/and the $R_{2n}C$ values read by the plurality of second driving-sensing electrodes 108, thereby improving the accuracy for detecting the coordinate of the touch spot at the high impedance direction H. The coordinate of the touch spot at the low impedance direction D can be determined by calculating the ratio of the total of the $R_{1n}C$ values detected by the plurality of first driving-sensing electrodes and the total of the $R_{2n}C$ values detected by the plurality of second driving-sensing electrodes.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for detecting touch spot of a touch panel, the touch panel comprising:
    a substrate;
    a conductive film disposed on the substrate, wherein the conductive film is impedance anisotropic and defines a low impedance direction and a high impedance direction substantially perpendicular to the low impedance direction, the conductive film has a first side and a second side opposite to the first side, a direction from the first side to the second side is the low impedance direction;
    a plurality of first driving-sensing electrodes arranged along the first side and spaced from each other;
    a plurality of second driving-sensing electrodes arranged along the second side and spaced from each other;
    wherein the plurality of first driving-sensing electrodes and the plurality of second driving-sensing electrodes are electrically connected with the conductive film, each of the plurality of first driving-sensing electrodes and the plurality of second driving-sensing electrodes is electrically connected with a driving circuit and a sensing circuit, when the touch panel is touched by a conductive object at a touch spot, a coupling capacitance having a capacitance value C between the conductive film and the conductive object is formed, a resistance of the conductive film between a touch spot and each of the plurality of first driving-sensing electrodes is represented by $R_{11}$, $R_{12}$, ... $R_{1n}$ (n=1, 2, 3, ...), and a resistance of the conductive film between the touch spot and each of the plurality of second driving-sensing electrodes is represented by $R_{21}$, $R_{22}$, ... $R_{2n}$ (n=1,2,3 ...);
    the method comprising:
        inputting a pulse signal into each of the plurality of first driving-sensing electrodes by the driving circuit, and reading a $R_{1n}C$ value detected by each of the sensing circuits, thereby simulating a first curve of $R_{1n}C$ values along the high impedance direction to compute a coordinate of the touch spot at the high impedance direction; and
        inputting a pulse signal into each of the plurality of second driving-sensing electrodes by the driving circuit, and reading a $R_{2n}C$ value detected by each of the sensing circuits, thereby simulating a second curve of the $R_{2n}C$ values along the high impedance direction; and
        computing a coordinate of the touch spot at the low impedance direction by the first curve and the second curve.

2. The method as claimed in claim 1, wherein the step of computing the coordinate of the touch spot at the high impedance direction comprises:
    selecting a largest value ($R_{1k}C$), a smallest value ($R_{1x}C$), a second smallest value ($R_{1y}C$) and a third smallest value ($R_{1z}C$) from the $R_{1n}C$ values, a coordinate ($X_x$) of the first driving-sensing electrode for detecting the $R_{1x}C$ at the high impedance direction, a coordinate ($X_y$) of the first driving-sensing electrode for detecting the $R_{1y}C$ at the high impedance direction, and a coordinate ($X_z$) of the first driving-sensing electrode for detecting the $R_{1z}C$ at the high impedance direction; and
    calculating the coordinate of the touch spot at the high impedance direction by using the $R_{1k}C$, the $R_{1x}C$, the $R_{1y}C$, the $R_{1z}C$, the $X_x$, the $X_y$, and the $X_z$ in interpolation.

3. The method as claimed in claim 2, wherein a formula for the interpolation is $$\frac{X_x \Delta R_{1x}C + X_y \Delta R_{1y}C + X_Z \Delta R_{1Z}C}{\Delta R_{1x}C + \Delta R_{1y}C + \Delta R_{1Z}C},$$

wherein $\Delta R_{1x}C = R_{1k}C - R_{1x}C$, $\Delta R_{1y}C = R_{1k}C - R_{1y}C$, $\Delta R_{1z}C = R_{1k}C - R_{1z}C$.

4. The method as claimed in claim 2, when the $R_{1y}C$ is equal to the $R_{1z}C$, a formula for the interpolation is $$\frac{X_z \Delta R_{1z}C + X_y \Delta R_{1y}C}{\Delta R_{1z}C + \Delta R_{1y}C},$$

wherein $\Delta R_{1y}C = R_{1k}C - R_{1y}C$, $\Delta R_{1z}C = R_{1k}C - R_{1z}C$.

5. The method as claimed in claim 2, when the $R_{1x}C$ is equal to the $R_{1y}C$, a formula for the interpolation is $$\frac{X_x \Delta R_{1x}C + X_y \Delta R_{1y}C}{\Delta R_{1x}C + \Delta R_{1y}C},$$

wherein $\Delta R_{1x}C = R_{1k}C - R_{1x}C$, $\Delta R_{1y}C = R_{1k}C - R_{1y}C$.

6. The method as claimed in claim 2, wherein the step of computing the coordinate of the touch spot at the low impedance direction by the first curve and the second curve comprises:
    at least detecting a smallest values ($R_{2x}C$) and a second smallest value ($R_{2y}C$) value from the $R_{2m}C$ values; and
    at least calculating a ratio of a total of the $R_{2x}C$ and the $R_{2y}C$ to a total of the $R_{1x}C$ and the $R_{1y}C$.

7. The method as claimed in claim 1, wherein the resistance $R_{1n}$ is proportional to a distance between the touch spot and the first side, and the resistance $R_{2m}$ is proportional to a distance between the touch spot and the second side.

8. The method as claimed in claim 1, wherein the pulse signals are input into the plurality of first driving-sensing electrodes one by one or simultaneously, and the pulse signals are input into the plurality of second driving-sensing electrodes one by one or simultaneously.

9. The method as claimed in claim 8, when the pulse signals are input into the plurality of first driving-sensing electrodes one by one, and the pulse signals are input into the plurality of second driving-sensing electrodes one by one, the first driving-sensing electrodes or the second driving-sensing electrodes not receiving the pulse signals are grounded.

10. The method as claimed in claim 1, wherein the coupling capacitance is alternately charged and discharged, and a charged period is larger than a discharged period.

11. The method as claimed in claim 10, wherein the coupling capacitance is gradually charged or discharged from a transient state to a steady state, and the $R_{1n}C$ value and the $R_{2n}C$ value are detected during the transient state.

12. The method as claimed in claim 1, wherein the driving circuit comprises a charging circuit adapted for charging the coupling capacitance and a first switch adapted for controlling the charging circuit.

13. The method as claimed in claim 12, wherein the sensing circuit comprises a storage circuit, a reading circuit and a second switch configured for controlling the storage circuit and the reading circuit.

14. The method as claimed in claim 13, wherein the storage circuit comprises a capacitor, when the coupling capacitance is discharged, the capacitor is charged.

15. The method as claimed in claim 13, wherein the first switch and the second switch are alternately turned on to form the pulse signals.

16. The method as claimed in claim 1, wherein the conductive film comprises at least one carbon nanotube film.

17. The method as claimed in claim 16, wherein the carbon nanotube film comprises a plurality of carbon nanotubes, the plurality of carbon nanotubes being arranged to substantially align in the low impedance direction.

18. The method as claimed in claim 17, wherein the conductive film comprises a plurality of carbon nanotube films overlapped with each other, and the aligned directions of the plurality of carbon nanotubes in the adjacent carbon nanotube films are the same.

* * * * *